2,900,367
Patented Aug. 18, 1959

2,900,367

RESINOUS COMPOSITIONS

Tzeng Jiueq Suen, New Canaan, and Yun Jen, Stamford, Conn., assignors to American Cyanamid Company, New York, N.Y., a corporation of Maine No Drawing. Application December 31, 1956
Serial No. 631,416

12 Claims. (Cl. 260—67.6)

This invention relates to certain novel resinous amine-aldehyde condensates.

An object of the invention is to provide a novel class of thermosetting resins.

Another object of the invention is to provide a novel paper composition of high wet strength.

Other objects and advantages of the invention will be apparent to those skilled in the art upon consideration of the detailed disclosure hereinbelow.

The present invention is concerned with compositions of matter which comprise thermosetting aldehyde condensates, which term is employed herein broadly to include also the alkylated (ether) aldehyde condensate, of a compound having the formula:

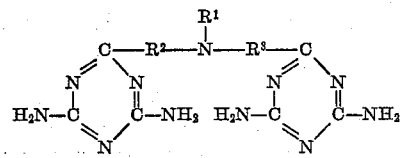

where $R^1$ is of the group consisting of hydrogen, alkyl, aryl and aralkyl radicals, and $R^2$ and $R^3$ each represent an alkylene radical; and also the insoluble and infusible cured products of the polymerization of such heat-convertible compositions. Narrower aspects of the invention involve the coreaction or mixture of one or more of the above novel condensates with conventional resin-forming materials such as phenolic, urea or melamine type resins. Other narrow aspects of the invention are concerned with the preferred aldehyde and proportions.

The novel resins comprise the various aldehyde condensates of diguanamines of the structural formula set forth hereinabove. Formaldehyde is preferred, especially in aqueous solution, but paraformaldehyde, hexamethylene tetramine, trioxane or other compounds engendering formaldehyde may also be employed. Examples of other suitable aldehydes include acetaldehyde, propionaldehyde, butyraldehyde, benzaldehyde, furfural, mixtures of these or mixtures of formaldehyde with any of these may also be employed. The cost, color and solubility required of the resinous condensates are the chief factors governing the selection of an aldehyde. The number of mols of aldehyde which combine chemically with a mol of the diguanamine may range from 1 to 8 mols (the theoretical maximum) and for most purposes about 2 to about 6 mols of the combined aldehyde is recommended. Since resins of this nature always contain some unreacted aldehyde, the quantity of aldehyde charged to the reaction mixture should be somewhat greater than the combined aldehyde content which is sought.

In the diguanamines of the structural formula set forth $R^1$ may be hydrogen or any hydrocarbon group containing up to 30 or even more carbons, that is an alkyl radical or an aryl group such as phenyl, naphthyl, methyl phenyl or an aryl alkyl group such as benzyl, phenyl methyl, diphenyl butyl. While the alkylene chains $R^2$ and $R^3$ may each contain up to 30 carbons also, it is usually preferred to have alkylene groups containing from 1 to 6 carbon atoms in the chains. These aldehyde-reactive resin precursors may be described best as amino or alkylamino bis(2-alkyl-4,6-diamino-s-triazines) or amino bisguanamines. For example, when $R^1$ represents methyl and $R^2$ and $R^3$ stand for ethylene groups in the above formula, the compound may be designated as beta, beta'-methylamino bis(2-ethyl-4,6-diamino-s-triazine) or as methylamino-N,N-bis(propioguanamine). For brevity, this class of compounds is referred to herein as diguanamines and a few representative examples include ethyl amino-N,N-bis(acetoguanamine), propylamino-N,N-bis(propioguanamine), octylamino-N,N-bis(butyroguanamine), octadecylamino-N,N - bis(propioguanamine), phenylamino-N,N - bis(propioguanamine), phenyl methylamino-N,N-bis(propioguanamine), and naphthylamino-N,N-bis(propioguanamine).

These diguanamines may be conveniently prepared by reacting 2 mols of dicyandiamide with 1 mol of an amino dinitrile. The latter compound determines the identity of the $R^1$, $R^2$ and $R^3$ of the above structural formula. For example, when methylamino-N,N-bis(propioguanamine) is desired, methylamino bis(propionitrile) should be reacted with the dicyandiamide. Suitable reaction conditions involve refluxing the reaction mass for several hours using about 300 ml. of ethylene glycol monoethyl ether as the reaction medium together with about 4 grams of potassium hydroxide per mol of reactant. The product crystallizes out of a hot solution and can be readily recovered by filtration.

The condensation of the diguanamine with formaldehyde or another aldehyde is desirably carried out in a liquid reaction medium preferably water. When water is present, the initial reaction to an essentially monomeric condensate is carried out on the alkaline side, that is at a pH between about 7 and 10, at a temperature between about 40° and about 100° C. When a partially polymerized resinous product is desired, as for example, in treatment of paper pulp to produce wet strength paper, the reaction mixture should be acidified after this initial condensation to a pH between about 0.5 and about 7 and further reacted until the desired extent of polymerization of the resin solution is reached.

A wide variety of other thermosetting resins may be physically blended with the diguanamine-aldehyde condensates or the resin precursors such as the diguanamine and phenol, resorcinol, urea or melamine may be coreacted with the selected aldehyde to form a co-condensate. Among the many suitable resin precursors suitable for reaction with any of the aldehydes named hereinabove are phenol, resorcinol and other polyhydroxy benzenes, and especially the amidogen compounds containing not less than two amidogen groups with each having at least one reactive hydrogen atom attached to the amido nitrogen atom. While urea is a good constituent of these blended resins, a wide variety of other amidogen compounds may be used including melamine, substituted methyl melamines as exemplified by methyl melamine and guanamines like acetoguanamine, thiourea, methyl urea, phenyl urea, phenyl thiourea, allyl urea, guanyl urea, guanyl thiourea, dicyandiamide, guanidine, biguanide, diaminodiazines, guanazole, and other diaminotriazines. Either separately or in co-condensation, it is desirable to provide sufficient aldehyde to provide for the combination of between about ⅓ and about 1 mol for each aldehyde-reactable amidogen grouping in the amidogen compound. These diguanamine-aldehyde resins as well as their amidogen blending compounds may not only be present as the unmodified amino-aldehyde condensates but also as the alkyl ethers thereof by reaction in known manner with aliphatic alcohols especially methanol and butanol.

The compositions of this invention possess wide utility as exemplified by the treatment of paper for wet strength, dry strength and sizing improvement, finishing textile fabrics and in the treatment of leather and cellophane, as well as adhesives, in molding and in forming both decorative paper laminates and structural laminates of glass cloth, mat and other strong fibers.

The compatible additives of the prior art for resins may be employed with the present resins for their usual purposes such as fillers like alpha cellulose, wood flour, walnut shell flour, asbestos, carbon black, atomaceous earth, glass fibers and ground cork; dyes, pigments and other colorants may be incorporated to alter the visual appearance and optical properties of the final product; mold lubricants, like zinc stearate, calcium stearate, glyceryl monostearate; and in certain instances, curing agents or catalysts such as phthalic anhydride, para-toluene sulfonic acid, phthalic acid, benzoyl peroxide, and the like.

For a better understanding of the nature and objects of this invention, reference should be had to the accompanying examples which are of an illustrative rather than a limiting nature and wherein all proportions are expressed in terms of weight unless otherwise stated therein.

Example 1

Methylamino-N,N-bis(propioguanamine) in the amount of 30.5 parts and 48.6 parts of 37% aqueous formaldehyde are reacted at 75° C. for 30 minutes at a pH of 8.4. The formaldehyde condensate thus obtained is acidified with 12 parts of 18% HCl to lower the pH to 4.0, and rapid polymerization commences. After 45 minutes at 55° C., a viscosity of "K" on the Gardner-Holdt scale is reached and the resin is neutralized with 7 parts of 20% NaOH whereupon a gummy solid resin precipitates.

Example 2

The solid resin of Example 1 is redissolved in 10 parts of 18% HCl and diluted to a total weight of 217 parts with water to produce a resin syrup containing 20% solids.

This syrup is added to bleached kraft pulp slurry in a quantity equivalent to 3% resin on the basis of oven dry pulp. Handsheets formed from this treated paper pulp have tensile strengths 7.3 lbs./inch wet and 32 lbs./inch dry versus 0.2 lb./inch wet and 24 lbs./inch dry for control handsheets from the same pulp before resin treatment.

Example 3

A mixture of 120 parts of urea, 12 parts of methylamino-N,N-bis(propioguanamine), and 405 parts of 37% formaldehyde are reacted at pH 8.4 for 25 minutes at 80-85° C. The condensation product is then acidified to pH 2.8 with HCl and the polymerization is allowed to proceed at 55° C. until a viscosity of "I" on the Gardner-Holdt scale is reached. The reaction is stopped by neutralizing with NaOH, yielding a syrup which is dispersible in water. When 3% of the resin is used to treat bleached kraft pulp as described in Example 2, the handsheet produced 5.7 lbs./inch wet tensile.

Example 4

In a reaction medium composed of equal weights of the ethanol and water in a vessel equipped with a stirrer and a reflux condenser, 1 mol each of formaldehyde, furfural and laurylamino-N,N-bis(hexylguanamine) are reacted with the pH of the reaction mass adjusted to 8.5 by heating to the reflux temperature and refluxing for about one-half hour. The resulting resinous solution is dried in a vacuum oven at 50° C. in trays to provide a solid polymerizable resin. Later 65 parts of this resin product are ball milled with 35 parts of chopped glass fibers and 0.6 part of para-toluene sulfonic acid as a catalyst until these additives are uniformly distributed throughout the resin. This resin composition is molded at 150° C. for about 5 minutes at 3000 p.s.i. to produce an infusible and insoluble molded article of excellent strength and appearance.

Example 5

A laminating resin is formulated by reacting 4 mols of 37% aqueous formaldehyde and 1 mol of amino-N,N-bis(propioguanamine) at a pH of 8 and a temperature of 70° C. for approximately 40 minutes. Then 41 parts of alpha methyl-dextro-glucoside is stirred in as a plasticizing agent, and the solution is diluted to a concentration of 45% solids by adding 50% aqueous ethanol thereto.

The above resin solution is transferred to a treating tank, and an overlay sheet and a decorative print sheet are run therethrough at speeds adjusted to provide a resin content of 65% in the overlay sheet and 45% in the print sheet on a dry basis. Next, these impregnated sheets are dried under a battery of heat lamps to a volatile content of about 5%. The two dried sheets are assembled in the usual order with 7 core sheets impregnated with 33% of a conventional phenolformaldehyde resin. Then the assembly is laminated by heating at 145° C. for about 45 minutes under a pressure of 1100 p.s.i. with the overlay sheet in contact with a highly polished stainless steel caul. The press is cooled to room temperature before unloading and the finished decorative laminate is found to have excellent physical characteristics and a highly polished surface which is resistant to a wide variety of staining substances.

Example 6

An aqueous solution of 4 mols of 37% formaldehyde is reacted with 1 mol of phenyl amino-N,N-bis(propioguanamine) at 70° C. for 2 hours at a pH of 8.3. The resulting resin solution is diluted and employed for sizing paper in producing paper of improved dimensional stability, increased wet and dry strength as well as better water repellency.

Example 7

Example 6 is repeated in full using phenyl ethyl amino-N,N-bis(propioguanamine). Closely similar results are obtained in the treatment of paper.

Example 8

Formalin containing 4 mols of formaldehyde is reacted at a pH of 8 and temperature of 70° C., for about 1 hour with 1 mol of amino-N,N-bis(propioguanamine). Next, 225 parts of water are removed by vacuum distillation and 400 parts of methanol are charged. Finally, the pH is adjusted to 6 using oxalic acid, and the mass is reacted for 2 hours at reflux temperature. The resulting alkylated dicarbamate condensate is applied to 80 x 80 cotton percale and cured thereon in the usual manner of applying textile treatments. The finished fabric displays excellent shrink resistance and wrinkle resistance.

Only a limited number of embodiments of the compositions of the present invention are set forth above; however, it is possible to produce still other embodiments without departing from the inventive concept disclosed herein and it is desired, therefore, that only such limitations be imposed on the appended claims as are stated therein.

We claim:

1. A composition of matter which comprises a thermosetting condensation reaction product of one mol of (1) a compound having the general formula:

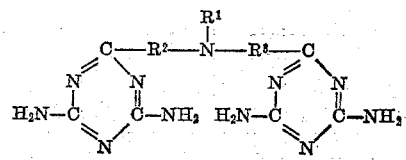

in which R¹ is a member selected from the group consisting of hydrogen, alkyl, aryl, and aralkyl radicals containing up to 30 carbon atoms, R² and R³ each represents an alkylene radical containing up to 30 carbon atoms, and from about one to eight mols of (2) an aldehyde selected from the group consisting of formaldehyde, acetaldehyde, propionaldehyde, butyraldehyde, benzaldehyde and furfural, wherein the condensation reaction of said (1) with said (2) is carried out at a temperature from about 40° C. to 100° C.

2. A composition of matter according to claim 1 in which the aldehyde comprises formaldehyde.

3. A composition of matter according to claim 1 in which the condensation reaction product contains from about one to eight mols of combined formaldehyde per mol of the compound having the said general formula.

4. A composition of matter according to claim 1 in which the condensation reaction product contains from about two to six mols of combined formaldehyde per mol of the compound having the said general formula.

5. A composition of matter which comprises a thermosetting condensation reaction product of one mol of methylamino-N,N-bis(propioguanamine) and from about two to six mols of formaldehyde and wherein the condensation reaction is carried out at a temperature from about 40° C. to 100° C.

6. A composition of matter which comprises a thermosetting condensation reaction product of (1) a compound having the general formula:

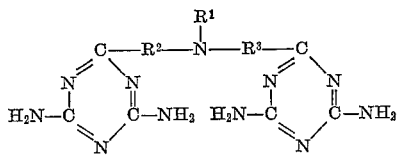

in which R¹ is a member selected from the group consisting of hydrogen, alkyl, aryl and aralkyl radicals containing up to 30 carbon atoms, R² and R³ each represents an alkylene radical containing up to 30 carbon atoms, (2) a substance of the group consisting of phenol, resorcinol, a urea, an aminotriazine, dicyandiamide, biguanide, an aminodiazine, and a guanazole, and (3) an aldehyde selected from the group consisting of formaldehyde, acetaldehyde, propionaldehyde, butyraldehyde, benzaldehyde and furfural, wherein the molar ratio of the sum total mols of said (1) and (2) to said (3) is from about 1:1 to 1:8, respectively, and wherein the condensation reaction is carried out at a temperature of from about 40° C. to 100° C.

7. A composition of matter which comprises a thermosetting condensate of (1) a compound having the general formula:

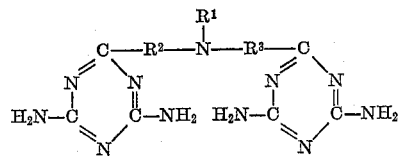

in which R¹ is a member selected from the group consisting of hydrogen, alkyl, aryl, and aralkyl radicals containing up to 30 carbon atoms, R² and R³ each represents an alkylene radical containing up to 30 carbon atoms, (2) an aldehyde-reactive resin-forming amidogen selected from the group consisting of a urea, an aminotriazine, dicyandiamide, biguanide, an aminodiazine, and a guanazole, and (3) an aldehyde selected from the group consisting of formaldehyde, acetaldehyde, propionaldehyde, butyraldehyde, benzaldehyde and furfural, wherein the molar ratio of the sum total mols of said (1) and (2) to said (3) is from about 1:1 to 1:8, respectively, and wherein the condensation reaction is carried out at a temperature from about 40° C. to 100° C.

8. A composition of matter according to claim 7 wherein the said amidogen compound is urea.

9. A composition of matter according to claim 7 wherein the compound having the said general formula is methylamino-N,N-bis(propioguanamine) and the said amidogen is urea.

10. A composition of matter which comprises an insoluble and infusible, thermoset product of the composition according to claim 1.

11. A composition of matter which comprises an insoluble and infusible, thermoset product of the composition according to claim 6.

12. A composition of matter which comprises an insoluble and infusible, thermoset product of the composition according to claim 8.

References Cited in the file of this patent

UNITED STATES PATENTS 2,653,143    De Benneville _____ Sept. 22, 1953

FOREIGN PATENTS 513,296    Canada _____ May 31, 1955

OTHER REFERENCES

Van Nostrand Chemists Dictionary, D. Van Nostrand Co., Inc., New York (1953), page 28 (amidogen). (Copy in Div. 60.)